United States Patent [19]

Inman

[11] 4,383,407
[45] May 17, 1983

[54] EXTENDIBLE THRUST NOZZLE FOR ROCKETS

[75] Inventor: Frank S. Inman, Brigham City, Utah

[73] Assignee: Thiokol Corporation, Newtown, Pa.

[21] Appl. No.: 230,939

[22] Filed: Feb. 2, 1981

[51] Int. Cl.³ .............................................. F02K 1/09
[52] U.S. Cl. .................................. 60/271; 239/265.33
[58] Field of Search ................................ 60/271, 242; 239/265.11, 265.19, 265.33; 74/58, 59

[56] References Cited

U.S. PATENT DOCUMENTS 2,570,269 10/1951 Anxionnaz et al. .................... 60/271
2,671,313 3/1954 Laramee ............................... 60/271
4,169,555 10/1979 Crowe ............................ 239/265.33

FOREIGN PATENT DOCUMENTS 1300405 12/1972 United Kingdom .................. 60/271

OTHER PUBLICATIONS

Inman et al., "Nested Extensible Cone Solid Rocket Nozzle Engineering Evaluation Program" paper presented at AIAA/SAE 14th Joint Propulsion Conference, Jul. 1978.

*Primary Examiner*—Louis J. Casaregola

*Attorney, Agent, or Firm*—Edward E. McCullough; Gerald K. White

[57] ABSTRACT

A convergent-divergent rocket nozzle is made to be extendible by moving successively larger, conic annuli into a tandem arrangement therewith, so that they collectively form a single exit cone. In a stowed position, the movable, conic annuli concentrically surround the primary nozzle. Each of these movable segments of the nozzle is moved relative to its adjacent upstream segment by being attached to rotary means that engage elongated positive traction surfaces on a set of guide members that are spaced circumferentially about and fixed at each end to the upstream segment, parallel to the axis of the nozzle. The rotary means are actuated, by means of a flexible shaft, by a small, electric motor that is mounted to each movable segment. When in fully deployed position, each movable segment is locked in place by tang latches, fixed to the adjcent, upstream segment, that engage an internal flange or shoulder on the movable segment. Prior to deployment, the rotary means is disengaged from the positive traction surface of each guide member, and the tang latches, being outwardly spring biased, then function as deceleration means to slow the segment being deployed. An elastomeric ring is confined between flanges of each adjacent pair of nozzle segments, where it functions as a hot gas seal and as a shock absorber.

19 Claims, 6 Drawing Figures

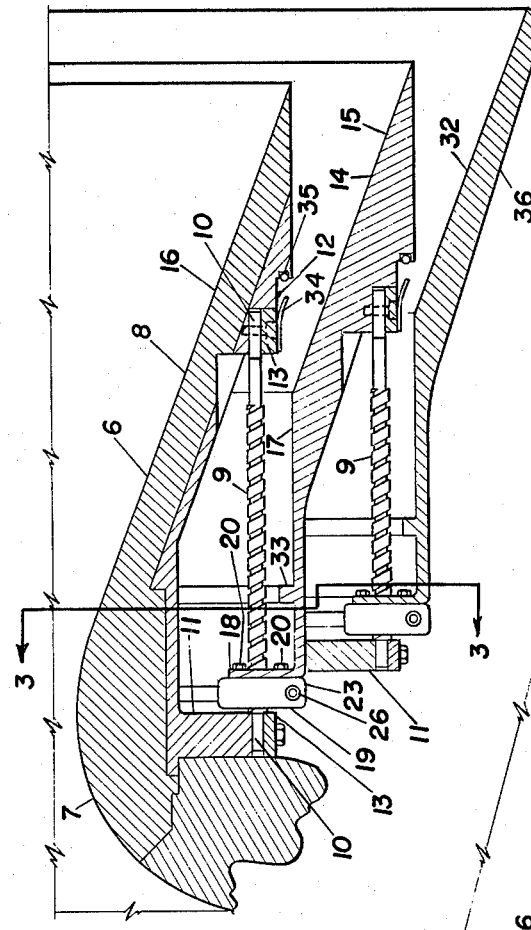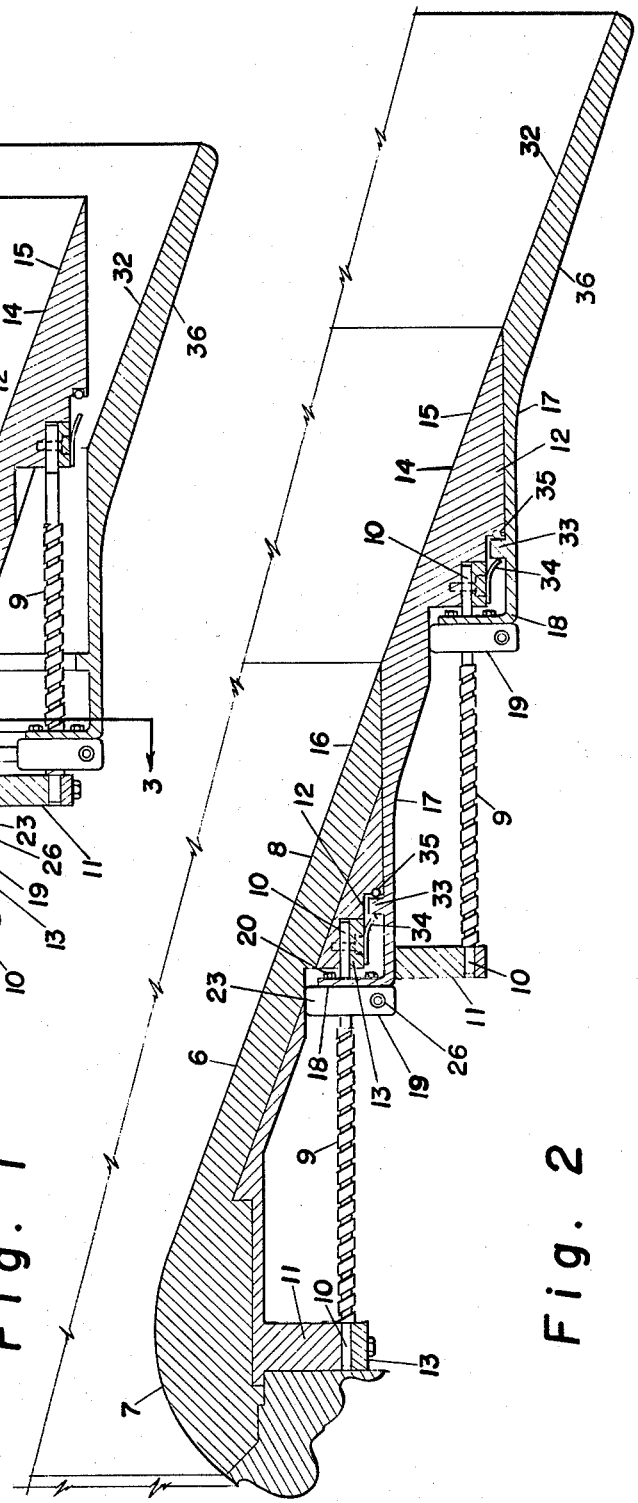

EXTENDIBLE THRUST NOZZLE FOR ROCKETS

The Government has rights in this invention pursuant to Contract No. F04611-74-C-0020 with the U.S. Air Force.

BACKGROUND OF THE INVENTION

1. Field of the Invention

This invention relates to rocket nozzles, especially to those that are extendible, and to means for deploying extendible exit cones of such nozzles.

2. Description of the Prior Art

A conventional thrust nozzle exit cone for rocket motor ballistic missile systems is designed for optimum performance at the median altitude of the intended trajectory. One of the functions of the exit cone of a rocket nozzle is to provide an inclined surface against which the expanding exhaust plume of the rocket can bear, and thereby to provide some of the forward thrust of the rocket. The exhaust plume grows larger with increasing altitude of the rocket, because of the decreasing pressure of the ambient atmosphere. Hence, in a conventional rocket nozzle, the exhaust plume is initially too small for the available surface area of the exit cone. This permits formation of a partial vacuum inside the edges of the exit cone, which creates an atmospheric drag on the rocket. At high altitudes, the exhaust plume is too large for the exit cone, so that much of its potential energy is unused.

A rocket nozzle that is sufficiently large to make full use of the expanding exhaust gases of a rocket in the low ambient pressures at high altitudes would normally occupy an inordinate proportion of the available storage space in silos, submarines, aircraft, or between stages of a multistage missile. Hence, there is a need in rocket motor ballistic missile systems for such a rocket nozzle that can be made to fit into a minimal storage space.

Various solutions have been proposed for this problem. These have included the use of inflatable exit cones, exit cones that are flexible and can be folded in various ways, exit cones formed by overlapping segments similar to the petals of a flower, and exit cones segmented longitudinally, as in the present invention. However, each of these ideas has produced its own problems, so that none has been entirely successful.

The present invention is essentially an improvement on an invention by the same inventor, described in a paper titled "Nested Extendible Exit Cone Solid Rocket Nozzle Engineering Evaluation Program," published in July of 1978, hereinafter termed "the prior invention." That paper described a rocket nozzle exit cone made to be extendible by a plurality of longitudinally divided segments. The first segment had the form of a conventional, convergent-divergent thrust nozzle attachable to a rocket case. The other segments were successively larger, conic annuli, movable relative to the first segment. In their stowed position, these movable segments surrounded the first segment. They were deployed into their extended positions by moving them aftwardly along the axis of the nozzle until they formed a single exit cone with that of the first segment.

The means in the prior invention for deploying the movable segments comprised a plurality of long screws that joined adjacent nozzle segments together. Each screw of a set passed through a threaded lug on the upstream segment of an adjacent pair and its aft end portion was seated in a socket fixed to the downstream segment so that rotational motion of the screw was permitted. All of these screws were synchronously rotated by a system of gear boxes and flexible shafts that were, in turn, rotated by a gas-actuated turbine, powered by compressed helium. A primary flexible shaft attached to gears rotated by the turbine joined the flexible shaft train of each set of screws.

The source of gas in this system was a pressure vessel filled with liquid helium under high pressure. The pressure vessel was opened to the system at the desired time by an explosive device that ruptured a diaphragm in the pressure vessel. The explosive device, in turn, was operated, via an electrical system, by a signal produced either by a timer or from ground control.

In operation, the screws were rotated very rapidly by the gas operated turbine and the movable nozzle segments were joined together into their deployed positions with considerable force. The shock of deployment was absorbed somewhat by an elastomeric ring seated between each pair of adjacent conic segments. This ring also functioned as a hot gas seal. A plurality of plug-and-receptacle latching mechanisms locked each pair of adjacent segments into its fully deployed position.

SUMMARY OF THE INVENTION

A primary object of the present invention is to provide for an extendible rocket nozzle exit cone having a plurality of longitudinally divided segments, a lighter weight, more reliable mechanism for deploying the movable segments into their extended positions.

According to the present invention, the long, rotating screws of the prior invention are replaced by sets of elongated, stationary guide members, with the guide members of each set being fixed at both ends to the same nozzle segment. Each segment except the last is equipped with such a set of guide members. The guide members of each set can either be long, stationary screws or rack gears. If the guide members are screws, the means for propelling a movable nozzle segment into its deployed position is a threaded nut on each of the stationary screws, the nut being fastened to the nozzle segment which is downstream of the one holding the screws. If the guide members are rack gears, the means for deploying a movable nozzle segment is a pinion gear fastened to the segment. In both embodiments, the prime mover for deploying the nozzle segments to their extended position is a small electric motor that is mounted to each movable segment and rotates the nuts or pinion gears by means of a flexible shaft and associated gear trains.

A feature of the nozzle segment deployment mechanism of the present invention is that considerably less mass is required to be rotated by the prime mover than was rotated in the prior invention for deployment of the exit cone. In the present invention, the only mass to be rotated is that of the nuts or pinion gears. Hence, for each pair of adjacent, conic segments, these nuts or gears can be rotated by a single, flexible shaft operated by a small electric motor. Also, in the prior invention, the prime mover was a pressure vessel filled with compressed helium, and the mass to be rotated thereby included the turbine, and an elaborate system of flexible shafts, in addition to the long screws.

Also, in the prior invention, each long screw was attached at one end to one nozzle segment and its other end to another segment. Hence, there was nothing to maintain the segments in rigid concentricity. This problem is solved in the present invention by the fact that both ends of each guide member of each set of guide members are fixed to the same nozzle segment. This provides a much more rigid system that promotes concentricity of the nozzle segments. This feature also makes an embodiment of the present invention easier to assemble.

In addition, the plug-and-receptacle latching system of the prior invention is replaced in the present invention by reed spring or tang latch members. These are attached at their forward ends to the end portion of the first or forward conic segment of an adjacent pair in such a manner that an inwardly-extending flange of the second or aft segment must pass over the tang members. By this means, the second segment is decelerated before being locked into a deployed position. Hence, the tang latches perform the dual function of decelerating and locking means. This latching system is also not only simpler and lighter in weight than that of the prior invention, but also it requires less precision to function reliably.

The nozzle segment deployment mechanism of the present invention offers a number of other advantages over the prior invention: (1) the entire hardware system is lighter in weight, which is a continuing design objective in rocket technology, so that the range and/or payload of the rocket may be maximized; (2) the mechanism of the present invention is safer, since it has no potentially explosive container of pressurized gas and no explosive ordnance device for opening such a container; (3) no rotating parts are exposed for possible fouling with electric wires, aerial debris, etc.; (4) since the guide screws do not rotate relative to the conic segments, their attachments to the segments are firmer and more positive; and (5) the motor individual to each of the sets of guide members mounted to the associated movable, conic segment can be quite small. This provides a simpler, more compact arrangement of parts and eliminates the primary flexible shaft that joined the flexible shaft trains of all movable segments in the prior invention. Additionally, since each movable nozzle segment is equipped with an independent actuation system, deployment of the movable nozzle segments relative to one another can be timed to create the least amount of drag as the rocket passes through the lower atmosphere.

DESCRIPTION OF THE DRAWINGS

In the drawings:

FIG. 1 is a partial, longitudinal section of the invention in its stowed position;

FIG. 2 is similar to FIG. 1, but shows the invention in its extended or deployed position;

DESCRIPTION OF THE PREFERRED EMBODIMENTS

Figure 3:
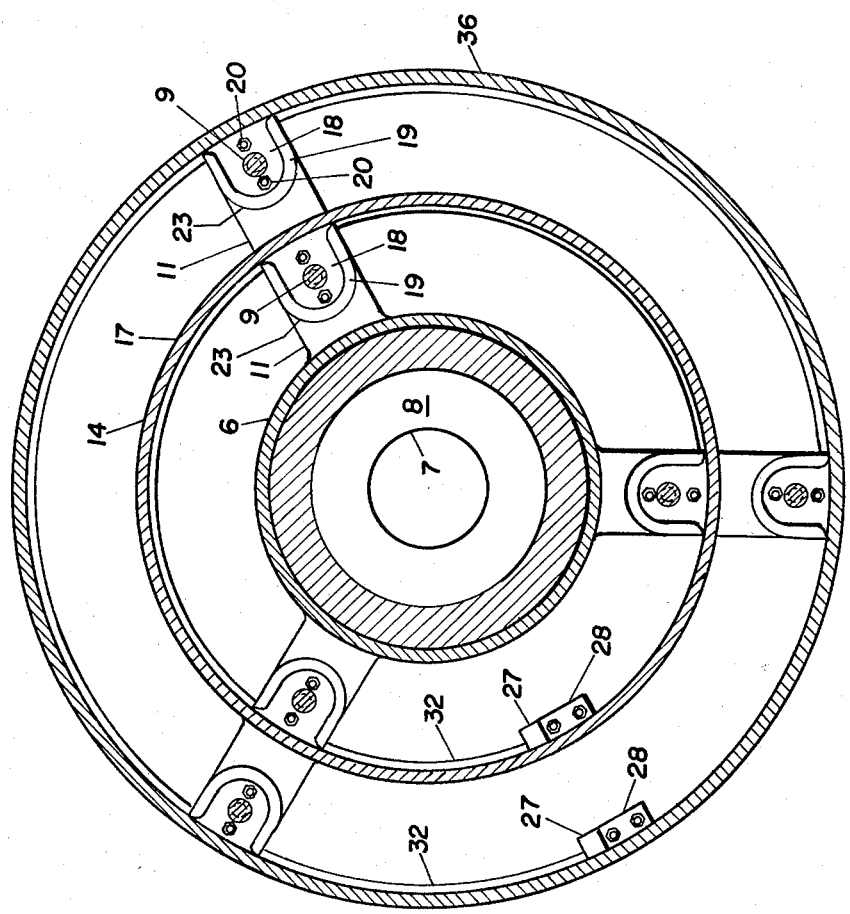
FIG. 3 is a full section taken on line 3—3 of FIG. 1.

The embodiment of the invention illustrated in FIGS. 1-3 is a thrust nozzle for rockets that is divided into segments longitudinally. The first or forward segment is a typical longitudinal thrust nozzle 6, which is of the conventional convergent-divergent type, having a venturi throat 7 and an exit cone 8. The only departure from the conventional thrust nozzle is that this nozzle segment is designed for optimum performance at sea level, rather than for the median altitude for the entire trajectory of the rocket. Hence, the first nozzle segment 6 is somewhat smaller than the conventional nozzle for a given rocket.

A plurality of stationary long screws 9 are equally spaced circumferentially about the exterior of the first nozzle segment 6. Each screw 9 has square end portions 10, so that it cannot rotate. They are retained in square recesses at their forward ends in brackets 11 fixed to the exterior of the first nozzle segment 6 and in square recesses at their aft ends in an annular shoulder 12 on the exterior of the exit cone 8. At both ends, screws 9 are retained in place by clamps 13 that are fastened by screws to the brackets 11 and to the shoulders 12, respectively. Screws 9 are disposed parallel to the axis of and are rigidly fixed at both ends to the nozzle segment 6.

A set of stationary screws 9 is associated with each of a plurality of nozzle segments that are provided and serve as guide members along which an adjacent aft or downstream nozzle segment may be deployed into an extended position without deviating from concentricity with the nozzle segment to which it is fixed. The threads of the screws 9 of each set function as positive traction surfaces along which a rotational traction means can propel the downstream segment.

As shown in FIGS. 1-3, a second longitudinal nozzle segment 14 is movable relative to the first segment 6 and has the form of a conic annulus. Segment 14 has an inner conic surface 15 that forms an extension of the inner surface 16 of the exit cone 8 of the first nozzle segment 6, when fully deployed in tandem, adjoining relationship therewith. The conic portion of the second nozzle segment 14 is integral with a cylindrical portion 17. A plurality of brackets 18 that are fixed to the forward edge portion of the cylinder 17 hold gear boxes 19 by means of screws 20, such that the gear boxes 19 are alignable with the screws 9.

Figure 4:
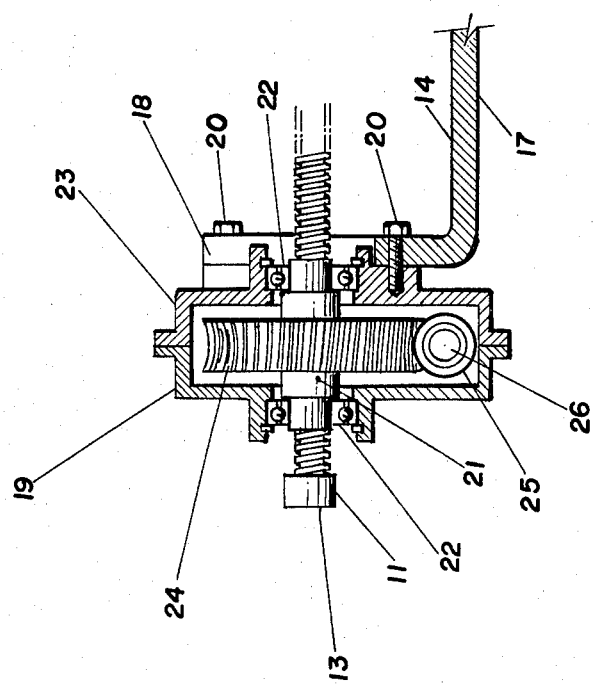
FIG. 4 is an enlarged, detail section showing the screw and nut attachment of one nozzle segment with another.

One of the gear boxes 19 is shown in a sectional view in FIG. 4. As shown in FIG. 4, a rotating nut 21, having internal threads matching those of the screw 9 is engaged on the threads of the screw 9, so that it follows the screw in an axial direction as the nut 21 is rotated. Desirably, the screws 9 and nuts 21 may have Acme threads. Each nut 21 is supported by ball bearings 22 in a housing 23 that is fixed to one of the brackets 18 by screws 20. Each nut 21 has teeth of a pinion worm gear 24 formed on its periphery. A second set of worm gears 25 is fixed to a flexible shaft 26 and engages the first set of gears 24 for rotational motion when the flexible shaft 26 is rotated.

Figure 6:
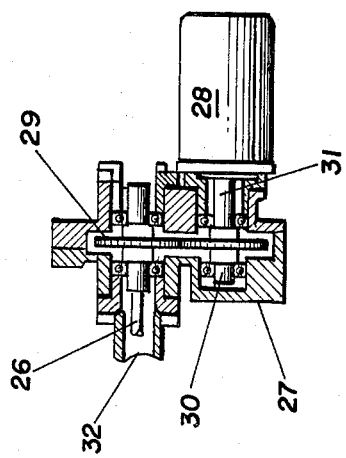
FIG. 6 is a sectional view showing the connection of a motor with a flexible shaft.

The flexible shaft 26 passes through each of the gear boxes 19 in the same manner and also passes through a small gear box 27 attached to a small electric motor 28. In gear box 27, as seen in FIG. 6, a worm gear 29 that is fixed to the flexible shaft 26 engages a second worm gear 30 that is fixed to the armature shaft 31 of the motor 28 for rotation of each of the nuts 21 when the motor 28 is turned on, as in response to a signal upon launching of the rocket. The flexible shaft 26 is enclosed in rigid, protective tubing 32 between gear boxes 19 and 27, as seen in FIGS. 3 and 6.

The cylindrical portion 17 of the second nozzle segment 14 has a small flange 33 on its inner surface. A multiplicity of tang latches 34 are fixed at their forward ends to the external shoulder 12 on the exit cone 8 in an annular array. These tang latches 34 are spring biased outwardly so that, as the second segment 14 is fully deployed, the flange 33 passes over the tang latches 34 and beyond the ends thereof so that the tang latches spring outwardly and trap the flange 33 tightly against an annular elastomeric ring 35. Ring 35 functions as a shock absorber and hot gas seal.

A third longitudinal nozzle segment 36 that is provided, as shown in FIGS. 1-3, is also a conic annulus and cooperates with the second nozzle segment 14 in the same way that the second segment 14 cooperates with the exit cone 8 of the first nozzle segment 6, to provide a continuation of the inner conic surface 15. Accordingly, the third nozzle segment 36 is also equipped with a cylindrical portion 17, brackets 18, and gear boxes 19. The gears 25 and nuts 21 in the gear boxes 19 are operated in the same manner relative to screws 9, i.e., they are rotated by a motor 28 by means of a flexible shaft 26. Also, the latching mechanism is identical to that described above. Specifically, a flange 33 on the inner surface of the cylindrical portion 17 of the third nozzle segment 36 slides in frictional contact over the ends of the tang latches 34, fixed to a shoulder 12 on the exterior of the second nozzle segment 14, and is locked thereby into its fully deployed position. An elastomeric ring 35 functions as a shock absorber and a hot gas seal as described above. However, since there are no further segments of the exit cone 8 shown in this embodiment, the exterior of the third nozzle segment 36 is not equipped with the brackets 11, shoulders 12, screws 9, tang latches 34, or the elastomeric ring 35. If there were additional nozzle segments, all of these features would apply to all segments from the first to and including the penultimate segment. It will be understood that while three nozzle segments, specifically segments 6, 14 and 36, have been shown in the embodiment of the invention herein illustrated that the scope of the invention is not to be so limited, and that, if desired, two segments only or additional nozzle segments may be employed to provide the nested extendible exit cone.

Figure 5:
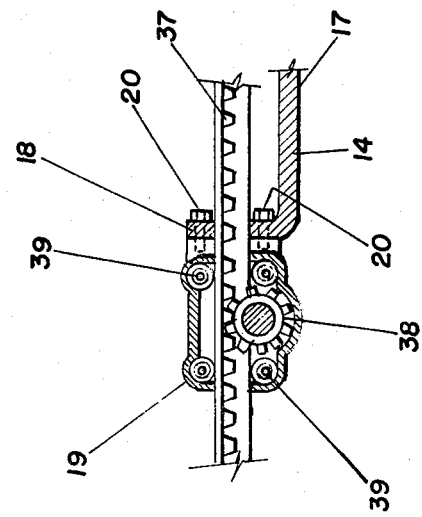
FIG. 5 is similar to FIG. 4, but shows a second embodiment of the invention.

A second embodiment of the invention is shown in FIG. 5. This embodiment is identical to that described above, except that the sets of long screws 9 shown in FIGS. 1-4 are replaced by sets of rack gears 37 and the nuts 21 are replaced by pinion gears 38. The teeth of the rack gears 37 and pinion gears 38 are preferably of a worm-gear configuration although other types of gears could be used. These sets of rack-and-pinion gears perform the same functions as do the sets of screws 9 and nuts 21. Depending on the speed desired, the pinion gears may be either fastened directly to the flexible shaft 26 (as shown in FIG. 5) or there may be intermediary gears. To promote smooth functioning of each of the sets of rack and pinion gears 37 and 38, the FIG. 5 embodiment of the invention further includes roller bearings 39 that are supported within the housing 23 so that they bear against the rack gears 37 on the sides thereof opposite the gear teeth, as well as against a flange (not shown) that is fixed to the rack gear 37 or other flat portions thereof.

OPERATION

When in stowed position, the second and third nozzle segments 14 and 36 concentrically surround the first nozzle segment 6 in a nested, compact, collapsed arrangement, as shown in FIG. 1.

Shortly after launch of a rocket to which an embodiment of the invention is attached, an electric signal is produced from ground control or from an accelerometer, timer, etc. to turn on each of the electric motors 28. The movable, second and third nozzle segments 14 and 36, respectively, are then rapidly deployed into an adjoining, tandem relationship with the first segment 6 so that, collectively, the nozzle segments provide a single exit cone. During this operation, the sets of long screws 9 or rack gears 37 function as rigid guide members that insure precise, concentric deployment of the nozzle segments relative to one another. The nuts 21 or the pinion gears 38, respectively associated with the screws 9 and rack gears 37, function as rotational traction means operating on the positive traction surfaces (i.e., the screw threads of the screws 9 or the gear teeth of the rack gears 37) of the guide members to move the movable segments 14 and 36 along the axis of the nozzle segment 6. It is noted, however, that the full extent of travel of the rotational traction means, nuts 21 or pinion gears 38, is greater than the effective length of the positive traction surfaces whereby the impetus or momentum gained by the movable segments 14 and 36 is the only force that propel the latter from the end of the positive traction surface to their fully deployed positions. The rotational traction means operating on the positive traction means move the segments 14 and 36 along the axis of the nozzle 6 a uniform rate. Uniform rate of rotation of the nuts or pinion gears 38 for a given movable nozzle segment is insured by the fact that they are all actuated by gears 25 fixed to a single, flexible shaft 26 rotated by a single, electric motor 28.

Near completion of its deployment, each movable, nozzle segment 6, 14 and 36 is: (1) relieved of power from the electric motor when its rotational traction means 21 or 38 runs off and passes beyond the end of the positive traction surfaces of the guide members 9 or 37 thereby dissipating residual deployment system rotational kinetic energies after deployment is complete (the positive traction surfaces 21 and 38 end short of the full travel of the adjacent, downstream nozzle segment for this purpose); (2) decelerated as it passes over the associated tang latches 34; and (3) locked into its deployed position and sealed to the adjacent nozzle segment by the tang latches 34 and the elastomeric ring 35.

Since each movable nozzle segment is independently actuated by its own electric motor, all nozzle segments can either be deployed simultaneously or their deployments relative to one another may be timed serially to create the least amount of drag as the rocket passes through the lower atmosphere on a ballistic trajectory.

Thus, there has been provided, according to the invention, an improvement to rocket motor exhaust nozzles having particular utility for interim and upper stage ballistic missile motors, and providing, also, improved sea level performance. The invention features a lighter weight, more reliable, and safer mechanism for deploying a multi position nozzle or nested extendible exit cone for rocket motors than has heretofore been available. The invention further features a mechanism of greater rigidity that promotes concentricity of the nested nozzle segments when in their extended positions. The improved mechanism is also characterized by its ease of assembly. The improved mechanism is further characterized in the provision of an independent actuation system for each of the nozzle segments whereby deployment of the segment of the nested extendible exit cone relative to one another can be so timed to minimize the drag as the rocket missile passes through the lower atmosphere.

An invention has been described that represents an advance in the art of rocket technology. Although the embodiments have been described with considerable specificity with regard to details, it should be noted that many details may be altered without departing from the scope of the invention as it is defined in the following claims.

The invention claimed is:

1. A nested extendible thrust nozzle for a rocket motor comprising;
   a plurality of nested nozzle segments, the inner one of said segments being attachable to a rocket motor case, and at least one outer segment being movable from a nested position relative to the inner segment to an extended, fully deployed position, said segments each having a divergent conic interior surface, which surfaces collectively form a single, substantially conic surface when said outer segment is in its fully deployed position;
   a set of elongated, stationary guide members fixed at each end to the exterior of said interior segment, each guide member of said set having an elongated positive traction surface that is disposed substantially parallel to the axis of the nozzle; and
   rotational traction means attached to said outer segment and engaging the traction surface of each of said guide members for moving said outer segment to its deployed position.

2. The nozzle of claim 1 further including means for actuating said rotational traction means.

3. The nozzle of claim 2 wherein the full extent of travel of said rotational traction means is greater than the length of said positive traction surface whereby mometum only moves said outer segment from the end of the positive traction surface to its fully deployed position.

4. The nozzle of claim 1 wherein said nozzle segments are longitudinal segments, said inner segment comprising a convergent-divergent thrust nozzle, and further including a plurality of outer segments, each of which outer segments is movable with respect to said inner segment to an individual, fully deployed position, and comprising successively larger, conic annuli the interior surfaces of which collectively form a single, substantially conic surface with the divergent portion of said inner segment when said outer segments are all deployed in adjoining, tandem arrangement,
   a set of elongated, stationary guide members fixed to the exterior of each of the segments to and including the penultimate outer segment, each guide member having a positive traction surface that is disposed substantially parallel to the axis of the nozzle;
   rotational traction means attached to each of the movable segments and engaging the traction surface of each guide member for moving its segment along the axis of the nozzle; and
   means for actuating the rotational traction means.

5. The nozzle of claim 4 wherein the positive traction surface on each guide member ends before the full extent of travel of the rotational traction means, so that only the momentum of each of the movable segments propels it from the end of the associated traction surfaces to its fully deployed position relative to the nozzle segment upstream thereof.

6. The nozzle of claim 5 wherein the guide members and their traction surfaces are screws and the rotational traction means is a threaded nut on each of the screws.

7. The nozzle of claim 6 wherein the screws and nuts have acme threads.

8. The nozzle of claim 5 wherein the guide members and their traction surfaces comprise rack gears and the rotational traction means is a pinion gear engaging each of the rack gears.

9. The nozzle of claim 8 further including roller bearings operatively attached to each pinion gear but bearing on flat portions of the rack gear.

10. The nozzle of claim 2 wherein the means for actuating the rotational traction means comprises:
    a flexible shaft;
    a first set of gears fixed to the flexible shaft, one said gear for each rotational traction means;
    a second set of gears, each gear fixed to one of said rotational traction means and engaging a gear of the first set, whereby the rotational traction means is actuated when the flexible shaft is rotated;
    a source of rotational power; and
    means for connecting the source of rotational power to the flexible shaft for rotation thereof.

11. The nozzle of claim 10 wherein the first and second sets of gears are worm gears.

12. The nozzle of claim 10 wherein the guide members and their traction surfaces are screws, the rotational traction means are threaded nuts on the screws, and the second set of gears comprises gear teeth formed on the periphery of each said nuts.

13. The nozzle of claim 10 wherein the source of rotational power is an electric motor.

14. The nozzle of claim 13 wherein the means for connecting the source of rotational power to the flexible shaft comprises a gear fixed to the armature shaft of the electric motor and a second gear engaged therewith and fixed to the flexible shaft.

15. The nozzle of claim 14 further including a plurality of housings, each housing enclosing one of said rotational traction means and the adjacent portions of its corresponding guide member and of the flexible shaft, and one of said housings enclosing the connection of the electric motor with the flexible shaft.

16. The nozzle of claim 15 further including protective tubes enclosing the flexible shaft between the housings.

17. The nozzle of claim 4 further including an annular array of tang latches fixed to the aft end portion of each nozzle segment to and including the penultimate segment, each tang latch being fixed at its forward end to its corresponding nozzle segment and spring biased outwardly therefrom; and an inwardly extending flange in the forward end portion of each of the movable nozzle segments that passes over the tang latches in frictional contact therewith until it moves beyond the ends of the latches, whereupon the latches spring into an abutting position against the flange, whereby the tang latches function to decelerate each of the movable members as well as to lock it into a deployed position.

18. The nozzle of claim 17 further including an annular, outwardly extending shoulder on the aft end portion of each of the nozzle segments to and including the penultimate segment; and an elastomeric ring seated in the surface of said shoulder so that it becomes confined between the shoulder and the inwardly extending flange of an adjacent nozzle segment when the segments are in deployed position, whereby the elastomeric ring functions as a hot gas seal and shock absorber between the nozzle segments.

19. The nozzle of claim 4 wherein there are three nozzle segments.

* * * * *